US009467684B2

(12) United States Patent
Yoon et al.

(10) Patent No.: US 9,467,684 B2
(45) Date of Patent: Oct. 11, 2016

(54) THREE DIMENSIONAL IMAGE DISPLAY DEVICE AND METHOD OF DISPLAYING THREE DIMENSIONAL IMAGE

(71) Applicant: Samsung Display Co., Ltd., Yongin (KR)

(72) Inventors: Il Yong Yoon, Seoul (KR); Hae Young Yun, Suwon-si (KR); Jin Hwan Kim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 595 days.

(21) Appl. No.: 13/952,946

(22) Filed: Jul. 29, 2013

(65) Prior Publication Data

US 2014/0285640 A1 Sep. 25, 2014

(30) Foreign Application Priority Data

Mar. 22, 2013 (KR) ........................ 10-2013-0031089

(51) Int. Cl.
*H04N 13/04* (2006.01)
*H04N 13/00* (2006.01)

(52) U.S. Cl.
CPC ...... *H04N 13/0415* (2013.01); *H04N 13/0011* (2013.01); *H04N 13/0037* (2013.01); *H04N 13/0404* (2013.01); *H04N 13/0422* (2013.01); *H04N 2213/003* (2013.01)

(58) Field of Classification Search
None
See application file for complete search history.

(56) References Cited

U.S. PATENT DOCUMENTS

2006/0209407 A1* 9/2006 Hamagishi ........... G02B 27/225 359/465
2007/0003134 A1* 1/2007 Song .................. H04N 13/0022 382/154
2007/0177006 A1 8/2007 De Zwart et al.
2011/0157159 A1* 6/2011 Chen .................. H04N 13/0011 345/419
2011/0242279 A1 10/2011 Redert et al.
2011/0316881 A1* 12/2011 Yoshifuji ........... H04N 13/0409 345/634
2011/0316986 A1* 12/2011 Matsubara ......... H04N 13/0029 348/51
2012/0113219 A1 5/2012 Chang et al.
2012/0133651 A1 5/2012 Schmidt (Continued)

FOREIGN PATENT DOCUMENTS

JP 2006287592 A * 10/2006 ............. G02B 27/22
JP 2007081873 A * 3/2007 ............. G06T 15/40
KR 10-2012-0070363 6/2012
WO WO 2006136978 A1 * 12/2006 ......... H04N 13/0003

OTHER PUBLICATIONS

"3D Interface Specifications, White Paper," Feb. 15, 2008, pp. 1-29, Philips 3D Solutions.

*Primary Examiner* — Sath V Perungavoor
*Assistant Examiner* — Nathnael Aynalem
(74) *Attorney, Agent, or Firm* — H.C. Park & Associates, PLC

(57) ABSTRACT

A 3D image display device includes: a display panel including pixels; a signal controller controlling driving of the display panel; and an image signal processor generating a 3D input image signal based on image information and outputting the generated 3D input image signal to the signal controller. The image signal processor includes a view point generating unit generating view points corresponding to the respective pixels, and a 3D input image signal generating unit generating the 3D input image signal for the respective pixels based on information on a position of the pixel, information on the generated view point for the respective pixel, and the image information.

18 Claims, 25 Drawing Sheets

(56) References Cited

U.S. PATENT DOCUMENTS

2012/0148147 A1* 6/2012 Ogata ................ H04N 13/0022 382/154
2012/0163701 A1* 6/2012 Gomi .................. H04N 13/026 382/154
2013/0016897 A1 1/2013 Cho et al.
2013/0027394 A1* 1/2013 Kho ...................... G06T 15/205 345/419
2013/0033488 A1* 2/2013 Takahashi .......... H04N 13/0418 345/419

* cited by examiner

THREE DIMENSIONAL IMAGE DISPLAY DEVICE AND METHOD OF DISPLAYING THREE DIMENSIONAL IMAGE

CROSS-REFERENCE TO RELATED APPLICATION

This application claims priority to and the benefit of Korean Patent Application No. 10-2013-0031089, filed in the Korean Intellectual Property Office on Mar. 22, 2013, the entire contents of which are incorporated herein by reference.

BACKGROUND

1. Technical Field

The present invention relates to a three dimensional image display device and a method of displaying a three dimensional image.

2. Description of the Related Art

With the development of display device technology, a display device which can display a 3 dimensional (3D) image has drawn attention, and various methods of displaying the 3D image have been researched.

In general, 3D image display technology represents a 3D effect of objects, using binocular parallax that is the most important factor for recognizing the 3D effect at a short distance. That is, different 2D images are observed by the left eye and the right eye, and when the image observed by the left eye (hereafter, referred to as "left eye image") and the image observed by the right eye (hereafter, referred to as "right eye image") are transmitted to the brain, the left eye image and the right eye image are recognized as a 3D image having depth perception converged in the brain.

3D image display devices utilize binocular parallax, and include a stereoscopic type 3D image display device, which using glasses, such as shutter glasses and polarized glasses, and an autostereoscopic type 3D image display device, which does not use glasses. Instead, the autostereoscopic type 3D image display device includes an optical system, such as a lenticular lens and a parallax barrier, in the display device.

The autostereoscopic type 3D image display device may display the 3D image by receiving 3D image information, or display the 3D image by a rendering method in which the 3D image is made by instilling the 3D effect in a 2D image by considering external information on a light source, a position, a color, and the like. The rendering method includes a method in which 2D image information and depth information is received and then the 3D image is made based on the 2D image information and the depth information.

The autostereoscopic type 3D image display device displays images so that the images may be recognized in a plurality of views for observers that are positioned at various angles.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a 3D image display device and a method of displaying a 3D image that may have simplified image signal processing for displaying the 3D image.

Exemplary embodiments of the present invention also provide a 3D image display device and a method of displaying a 3D image that may have simplified image processing for displaying the 3D image even in a lot of views.

Exemplary embodiments of the present invention also provide a 3D image display device and a method of displaying a 3D image that may display a clear 3D image without displaying a double image in all views.

Exemplary embodiments of the present invention also provide a 3D image display device and a method of displaying a 3D image that may reduce occurrences of left and right images from being reversely inputted to a left eye and a right eye, increase a 3D image viewing area, and prevent the resolution of the image from deteriorating.

An exemplary embodiment of the present invention provides a 3D image display device that includes a display panel including pixels; a signal controller to drive the display panel; and an image signal processor to generate a 3D input image signal based on image information and output the generated 3D input image signal to the signal controller. The image signal processor includes a view point generating unit to generate view points corresponding to the respective pixels, and a 3D input image signal generating unit to generate the 3D input image signal for the respective pixels based on information on a position of the pixel, information on the generated view point for the respective pixel, and the image information.

Another exemplary embodiment of the present invention provides a method of displaying a 3D image in a 3D image display device including a display panel including pixels and an image signal processor that generates a 3D input image signal based on image information. The method includes generating view points corresponding to the respective pixels, and generating the 3D input image signal for the respective pixels based on information on a position of the pixel, information on the generated view point for the respective pixel, and the image information.

It is to be understood that both the foregoing general description and the following detailed description are exemplary and explanatory and are intended to provide further explanation of the invention as claimed

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Hereinafter, a 3D image display device and a method of displaying a 3D image according to an exemplary embodiment of the present invention will be described in detail with reference to the accompanying drawings.

First, a 3D image display device according to an exemplary embodiment of the present invention will be described with reference to FIGS. 1 and 2.

Figure 1:
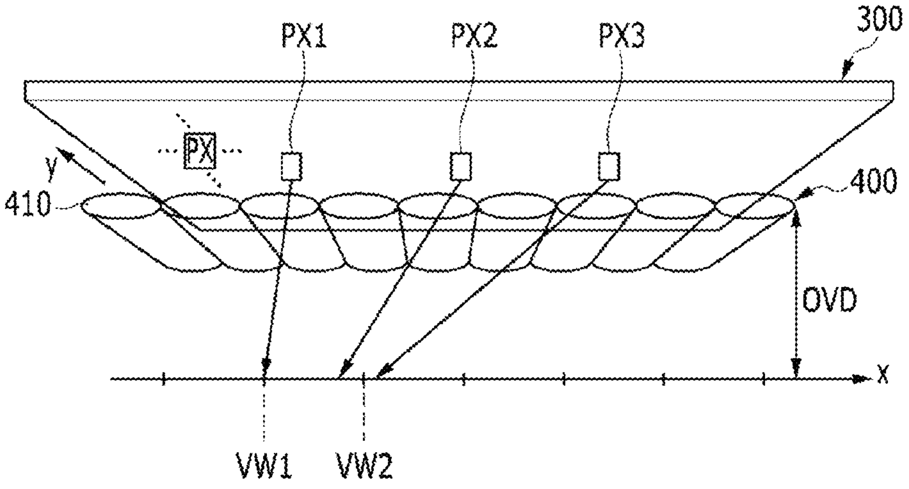
FIG. 1 is a schematic side view illustrating a 3D image display device according to an exemplary embodiment of the present invention.
Figure 2:
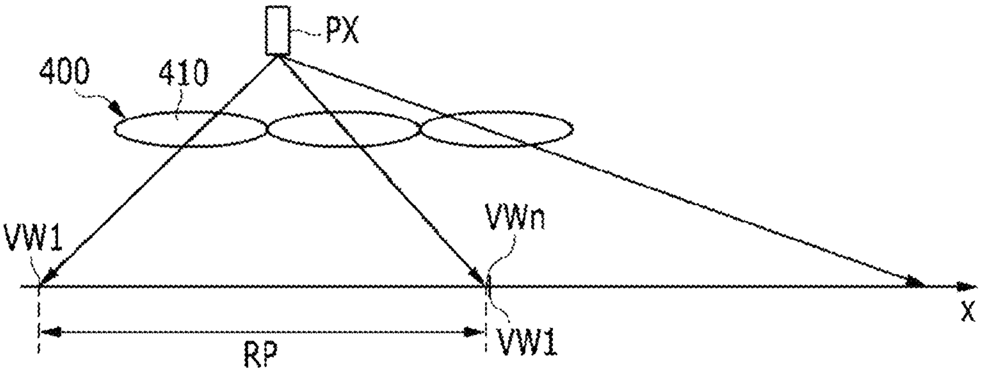
FIG. 2 is a diagram illustrating an optical system and views due to the optical system in the 3D image display device according to an exemplary embodiment of the present invention.

FIG. 1 is a schematic side view illustrating a 3D image display device according to an exemplary embodiment of the present invention, and FIG. 2 is a diagram illustrating an optical system and views due to the optical system in the 3D image display device according to the exemplary embodiment of the present invention.

Referring to FIG. 1, a 3D image display device according to an exemplary embodiment of the present invention includes a display panel 300 to display an image and an optical system 400. The 3D image display device 300 may be configured to operate in both a 2D image display mode and a 3D image display mode, or it may be configured to operate exclusively in the 3D image display mode.

The display panel 300 may also be a display panel included in various kinds of display devices such as a liquid crystal display, an organic light emitting diode display, a plasma display, an electrophoresis display, and the like. The display panel 300 may include a light source (not shown).

The display panel 300 includes a plurality of signal lines and a plurality of pixels PX connected to the signal lines when viewed from an equivalent circuit. The plurality of pixels PX may be arranged in a substantially matrix form. The signal lines may include a plurality of gate lines to transfer gate signals (referred to as "scanning signals") and a plurality of data lines to transfer data signals, such as data voltages. The plurality of gate lines may extend substantially in a row direction and be substantially parallel to each other. The plurality of data lines may extend substantially in a column direction and be substantially parallel to each other. In FIG. 1, the row direction is represented by an x-axial direction, and the column direction is represented by a y-axial direction.

The pixel PX may uniquely display one of the primary colors (i.e., spatial division) or the plurality of pixels may alternately display the primary colors with time (i.e., temporal division), and as a result, a desired color may be displayed by the spatial and temporal sum of the primary colors. An example of the primary colors may include three primary colors such as red, green, and blue. A plurality of adjacent pixels PX displaying different primary colors may configure one set (referred to as a dot) together. One dot may be used to display a white image.

A 3D image display device according to an exemplary embodiment of the present invention may further include at least one driver to transfer gate signals, data signals, and driving signals such as various control signals to the display panel 300. For example, the drivers may be installed in the 3D image display device in an integrated circuit (IC) chip form or integrated on the display panel 300 together with other electric elements.

The optical system 400 transmits light of an image displayed by each pixel PX of the display panel 300 to view points VW1, VW2, . . . corresponding to each pixel PX. When a distance between the 3D image display device and a point where an optimal 3D image is capable of being viewed is called an optimal viewing distance OVD, an x-axial directional position of the point which the light of the image displayed by each pixel PX reaches at the optimal viewing distance OVD is called a view point. According to an exemplary embodiment of the present invention, each pixel PX of the display panel 300 corresponds to one view point VW1, VW2, . . . , and each pixel PX may transmit light of the image to the corresponding view point VW1, VW2, . . . through the optical system 400. A viewer views different images by respective eyes at different view points, and thus may observe depth perception, that is, a 3D effect.

FIG. 1 illustrates a finite number of view points VW1, VW2, . . . positioned at the optimal viewing distance OVD as an example. For example, when a view point at which an image displayed by one pixel PX1 is viewed is a first view point VW1, a view point at which an image displayed by the other pixel PX2 is viewed may be a second view point VW2 different from the first view point VW1, and a view point at which an image displayed by another pixel PX3 is viewed may be the same second view point VW2 as the pixel PX2. However, the number of view points VW1, VW2, . . . is not limited and may be substantially continuous.

The optical system 400 may include, for example, a plurality of lenses 410 arranged in an x-axial direction, which is the row direction, as illustrated in FIGS. 1 and 2. Each lens 410 may be almost elongated in a y-axial direction, which is the column direction, but is not limited thereto and may be inclined at a predetermined angle with the y-axial direction.

Referring to FIG. 2, light of an image displayed by all pixels PX of the display panel 300 reaches any one view point VW1-VWn (n is a natural number) of a unit view area RP having a predetermined viewing angle through the optical system 400. That is, the view points VW1-VWn corresponding to all pixels PX exist in any one unit view area RP, and a corresponding view point of each pixel PX may be allocated in one unit view area RP according to a position that light reaches.

Each unit view area RP may include a finite number of view points VW1-VWn. When each unit view area RP includes a finite number of view points, each view point VW1-VWn may have, for example, a width of approximately 0.5° to 2°, but is not limited thereto.

When the optical system 400 includes the plurality of lenses 410, the unit view areas RP may be periodically repeated on the optimal viewing distance OVD, and the order of the view points VW1-VWn may be regular in each unit view area RP. For example, as illustrated in FIG. 2, the image displayed by any one pixel PX of the display panel 300 may be optimally viewed in one view point VW1 of one unit view area RP through one lens 410 of the optical system 400 and may be optimally viewed in the same view point VW1 of another unit view area RP through another lens 410.

Two eyes of the viewer view the images reached in different view points in one unit view area RP to observe the 3D effect of the image. In this case, the left eye receives a left image in a partial region of the unit view area RP, and the right eye receives a right image, thereby viewing an orthoscopic image. Further, according to an exemplary embodiment of the present invention, the left eye receives the right image in the other partial region of the unit view area RP and the right eye receives the left image, thereby viewing a reverse-scopic image.

A 3D image display device according to an exemplary embodiment of the present invention will be described in more detail with reference to FIG. 3 together with FIGS. 1 and 2 described above.

Figure 3:
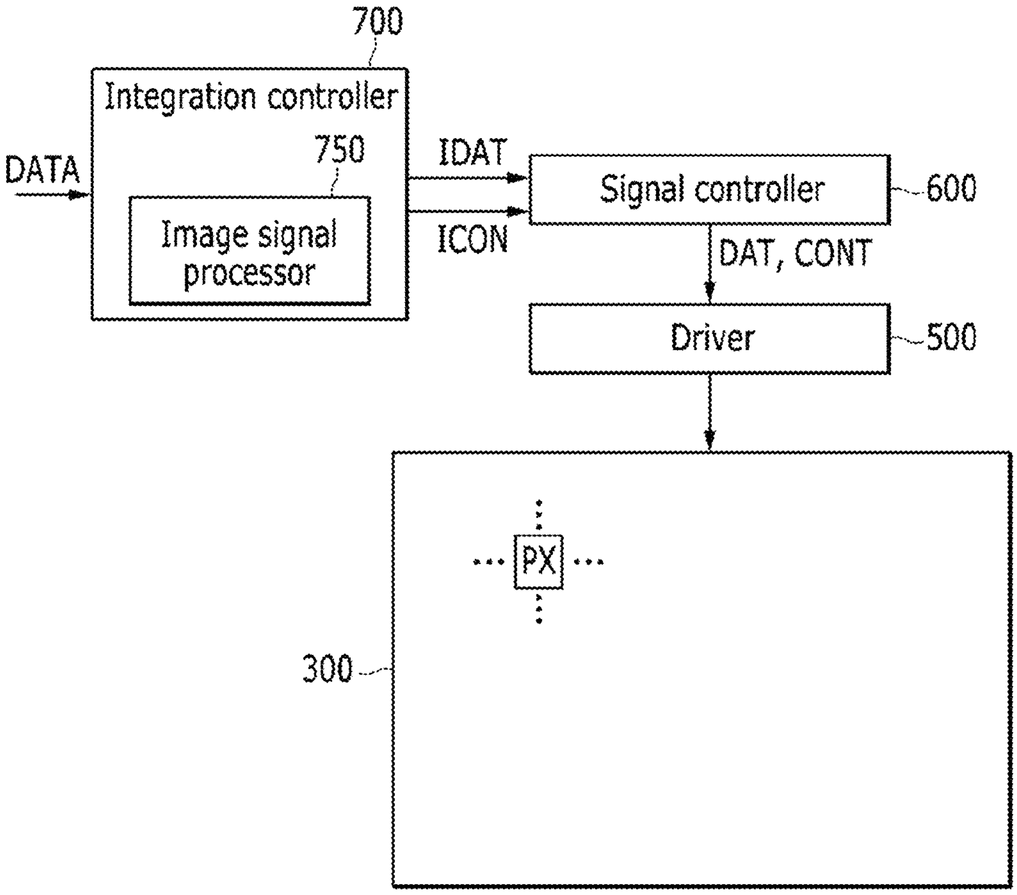
FIG. 3 is a block diagram illustrating the 3D image display device according to an exemplary embodiment of the present invention.

FIG. 3 is a block diagram illustrating a 3D image display device according to an exemplary embodiment of the present invention.

Referring to FIG. 3, a 3D image display device includes the display panel 300, at least one driver 500 connected to the display panel 300, a signal controller 600 controlling the driver 500, and an integration controller 700.

According to exemplary embodiments, the driver 500, signal controller 600, and the integration controller 700 may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the processes described herein to facilitate image signal processing and the display of images via display device 300 may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. In this manner, the display device of FIG. 3 may include or otherwise be associated with one or more memories including code (e.g., instructions) configured to cause the display device to perform one or more of the processes and/or features described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

The integration controller 700 receives image information DATA and the like to process an image for display. The image information DATA may include information on a kind of image, which represents whether an image to be displayed is a 2D image or a 3D image.

The integration controller 700 generates an input image signal IDAT and an input control signal ICON controlling a display of the input image signal IDAT based on the image information DATA and the like. The integration controller 700 transfers the input image signal IDAT and the input control signal ICON to the signal controller 600. The input image signal IDAT includes luminance information, and luminance may have a predetermined number of grays. The input image signal IDAT may include a 2D input image signal for displaying the 2D image and a 3D input image signal for displaying the 3D image. Thereafter, the input image signal IDAT is mainly represented as the 3D input image signal IDAT. The input control signal ICON may include a vertical synchronization signal Vsync, a horizontal synchronizing signal Hsync, a main clock MCLK, a data enable signal DE, and the like in accordance with the image display.

The 3D image display device may include an image signal processor 750, and the image signal processor 750 may be included in the integration controller 700. The image signal processor 750 may determine a view point corresponding to each pixel PX in the case where inputted image information DATA is image information on the 3D image and generate the 3D input image signal IDAT corresponding to an image viewed in each view point. A position of the image signal processor 750 is not limited to that illustrated in FIG. 3, as it may be disposed at other elements, such as the signal controller 600.

The signal controller 600 controls driving of the display panel 300. In more detail, the signal controller 600 receives the input image signal IDAT and the input control signal ICON from the integration controller 700 and controls the operation of the driver 500. The signal controller 600 appropriately processes the input image signal IDAT based on the input image signal IDAT and the input control signal ICON in accordance with an operational condition of the display panel 300 to generate an output image signal DAT, and generates various control signals CONT and the like to transfer the generated control signals CONT and the like to the driver 500.

The driver 500 may include, for example, a gate driver and a data driver. The gate driver is connected to gate lines of the display panel 300 and sequentially applies gate signals, configured by a combination of a gate-on voltage Von and a gate-off voltage Voff, to the gate lines. The data driver is connected to data lines of the display panel 300 and converts the output image signal DAT into a data voltage to apply the data voltage to the data lines.

Then, the 3D image display device, particularly, the image signal processor 750 according to the exemplary embodiment of the present invention will be described in detail with reference to FIGS. 4 to 8 together with the drawings described above.

Figure 4:
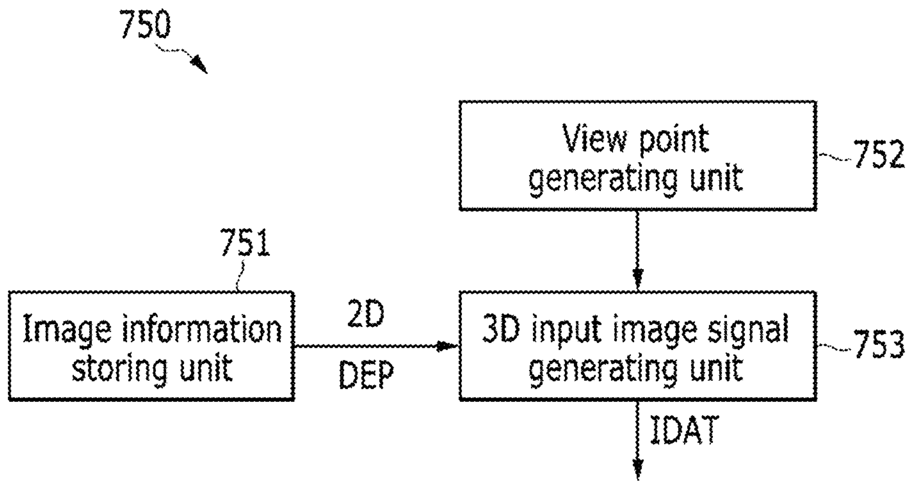
FIG. 4 is a block diagram illustrating an image processor of the 3D image display device according to an exemplary embodiment of the present invention.
Figure 5:
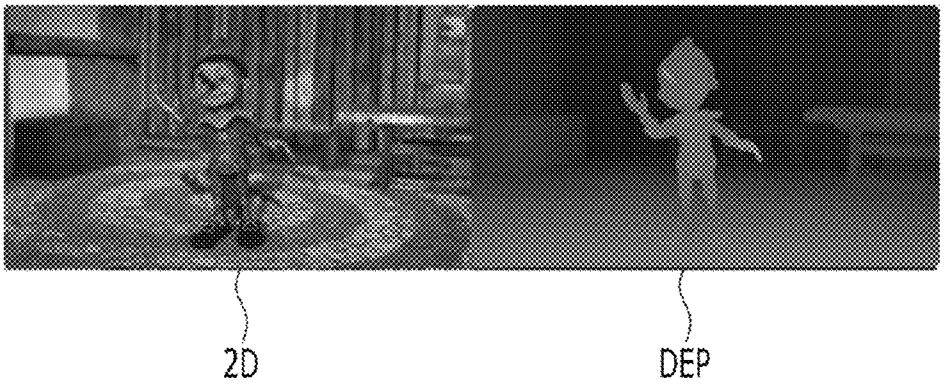
FIG. 5 is a diagram illustrating a 2D image and depth information that may be processed in the 3D image display device according to an exemplary embodiment of the present invention.
Figure 6:
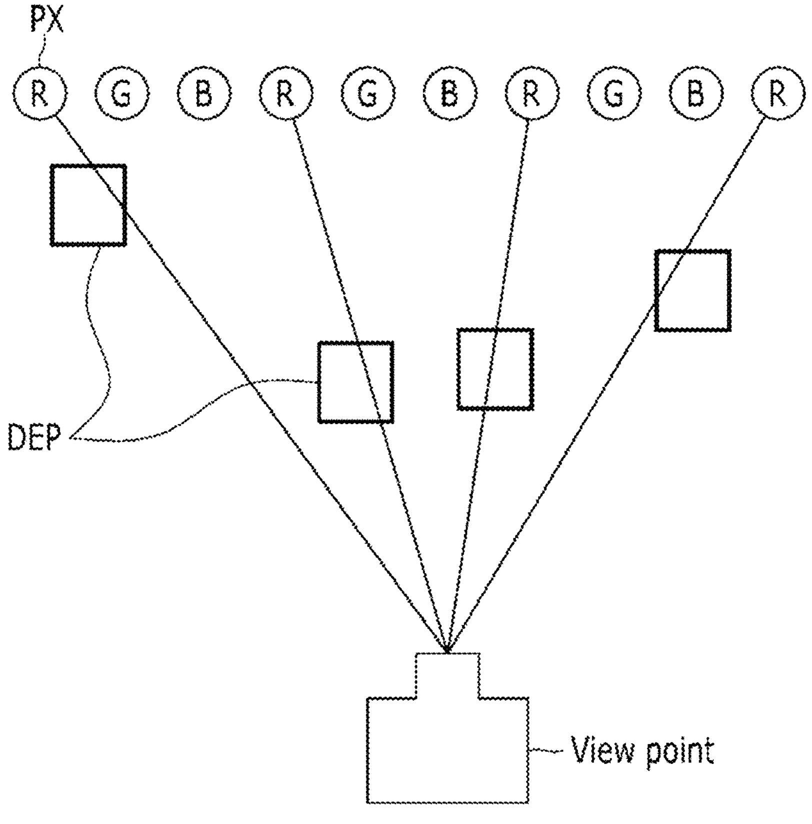
FIG. 6 is a diagram of a pixel transmitting light toward a view point where an image is observed and depth information corresponding to each pixel in the 3D image display device according to an exemplary embodiment of the present invention.
Figure 7:
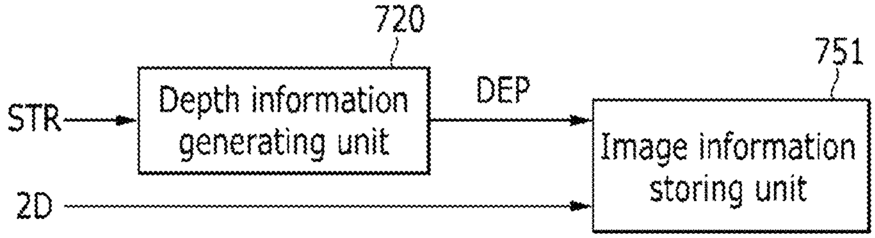
FIGS. 7 and 8 are block diagrams illustrating a part of an integration controller of the 3D image display device according to an exemplary embodiment of the present invention.
Figure 8:
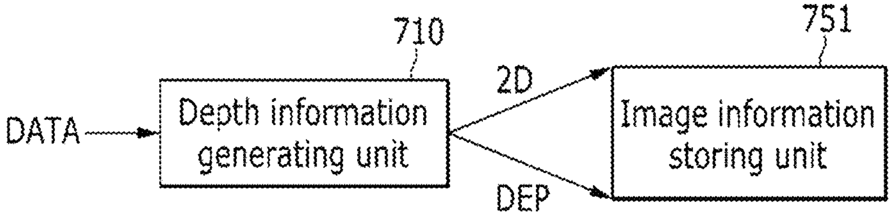

FIG. 4 is a block diagram illustrating an image processor of the 3D image display device according to an exemplary embodiment of the present invention, FIG. 5 is a diagram illustrating a 2D image and depth information which are processed in the 3D image display device according to an exemplary embodiment of the present invention, FIG. 6 is a diagram a pixel transmitting light toward a view point where an image is observed and depth information corresponding to each pixel in the 3D image display device according to an exemplary embodiment of the present invention, and FIGS. 7 and 8 are block diagrams illustrating a part of an integration controller of the 3D image display device according to an exemplary embodiment of the present invention.

First, referring to FIG. 4, the image signal processor 750 includes a view point generating unit 752 and a 3D input image signal generating unit 753.

The view point generating unit 752 generates view points corresponding to the respective pixels PX of the display panel 300. In this case, characteristics such as a pitch, a size, a slope, and a focal distance of the lens of the optical system 400, and a relative position of the pixel PX may be considered. As described above, all the pixels PX correspond to any one view point VW1-VWn of one unit view area RP of the displayed image.

The 3D input image signal generating unit 753 generates the 3D input image signal IDAT based on information on a position of the pixel PX, information on a view point of each pixel PX, and image information. The image information used in the 3D input image signal generating unit 753 may be 3D image information as the image information DATA inputted from the outside, and may be 2D image information 2D and depth information DEP.

FIG. 4 illustrates an example in which the 3D input image signal generating unit 753 uses the 2D image information 2D and the depth information DEP. Referring to FIG. 4, the image signal processor 750 may further include an image information storing unit 751. The image information storing unit 751 stores the 2D image information 2D and the depth information DEP and transmits the 2D image information 2D and the depth information DEP to the 3D input image signal generating unit 753.

Referring to FIGS. 5 and 6, the 2D image information 2D includes information on images displayed by all the pixels PX of the display panel 300, and the depth information DEP represents information on a depth of the 2D image, that is, the protruding or receding degree from each portion. The depth information DEP includes a depth surface (referred to as a "depth map") representing the depth degree of the 2D image. Each dot of the depth surface may have a unique 3D coordinate by the depth information DEP and 2D position information of the dot.

When the resolution of the 2D image information 2D is lower than the resolution of the display panel 300, the resolution of the 2D image information 2D may be increased through interpolation and then stored in the image information storing unit 751, and the stored 2D image information 2D may be supplied to the 3D input image signal generating unit 753. Unlike this, whenever the 3D input image signal generating unit 753 generates the 3D input image signal IDAT, the resolution of the 2D image information 2D may be increased through interpolation and then used.

The depth information DEP may be displayed by the 2D image. The resolution of the depth information DEP may be the same as the resolution of the 2D image information 2D, or may be lower than the resolution of the 2D image information 2D. If the resolution of the depth information DEP is the same as the resolution of the 2D image information 2D, the depth information DEP corresponding to all the pixels PX may exist.

FIG. 6 illustrates an example in which the resolution of the depth information DEP is lower than the resolution of the display panel 300. That is, some pixels PX have the corresponding depth information DEP, but some pixels PX may not have the corresponding depth information DEP. For example, in the case where the pixel PX expresses any one color of red, green, and blue, one depth information DEP per one dot may correspond to the expressed color. For example, like the exemplary embodiment illustrated in FIG. 6, each depth information DEP may correspond to a red pixel R of each dot, but is not limited thereto, and the depth information DEP may correspond to a green pixel G or a blue pixel B. Further, the depth information DEP may correspond to one of the plurality of dots.

In the case where the resolution of the depth information DEP is lower than the resolution of the display panel 300, the resolution of the depth information DEP may be increased through interpolation and then stored in the image information storing unit 751, and the resolution of the depth information DEP may be supplied to the 3D input image signal generating unit 753. In addition, whenever the 3D input image signal generating unit 753 generates the 3D input image signal IDAT, the resolution of the depth information DEP may be increased through interpolation and then used. Unlike this, the resolution of the depth information DEP may not be changed and may be used as it is.

The depth information DEP corresponds to fundamental information to generate the 3D input image signal IDAT from the 2D image information 2D.

The depth information DEP may be directly received as the image information DATA from the outside or generated from the image information DATA. This will be described in detail with reference to FIGS. 7 and 8.

Referring to FIG. 7, the integration controller 700 of the 3D image display device according to the exemplary embodiment of the present invention may further include a depth information generating unit 720. According to the exemplary embodiment, the image information DATA may include the 2D image information 2D and stereo information STR. The depth information generating unit 720 may receive the stereo information STR to convert the received stereo information STR into the depth information DEP and transmit the depth information DEP to the image information storing unit 751. However, according to another exemplary embodiment of the present invention, the depth information generating unit 720 may be omitted, and the image information DATA includes the 2D image information 2D and the depth information DEP to be directly inputted to the image information storing unit 751.

Referring to FIG. 8, the integration controller 700 of the 3D image display device according to the exemplary embodiment of the present invention may further include a demultiplexer 710 generating the 2D image information 2D and the depth information DEP from the image information DATA inputted from the outside.

A method of displaying a 3D image according to an exemplary embodiment of the present invention will be described with reference to FIG. 9 together with the drawings described above.

Figure 9:
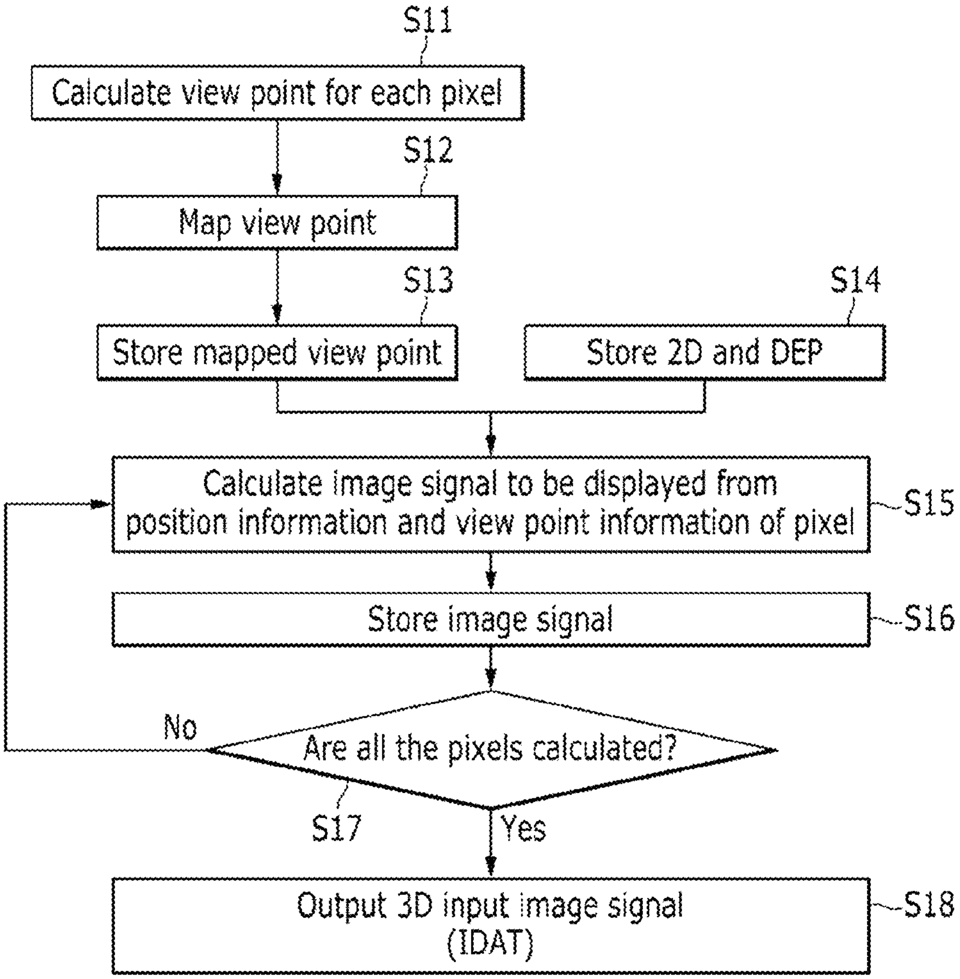
FIG. 9 is a flowchart illustrating a process of generating a 3D image signal in the 3D image display device according to an exemplary embodiment of the present invention.

FIG. 9 is a flowchart illustrating a process of generating a 3D image signal in the 3D image display device according to an exemplary embodiment of the present invention.

Referring to FIG. 9, the view point generating unit 752 of the image signal processor 750 generates the view points corresponding to the respective pixels PX of the display panel 300. Each generated view point is mapped to each corresponding pixel PX (S12) and stored in a memory of the view point generating unit 752 (S13). When the 3D input image signal generating unit 753 generates the 3D input image signal IDAT by using the 2D image information 2D and the depth information DEP, the image information storing unit 751 stores the inputted or generated 2D image information 2D and depth information DEP (S14).

Next, the 3D input image signal generating unit 753 generates an image signal to be displayed by the corresponding pixel PX based on information on a position of the pixel PX, information on a view point of the pixel PX, and the 2D image information 2D and the depth information DEP or 3D image information, which are the image information (S15). The generated image signal of each pixel PX may be stored in a separate memory (S16). After the process is repeated until the generating of the image signals for all the pixels PX ends (S17), the 3D input image signals IDAT, which are the image signals for all the pixels PX, are outputted (S18).

Unlike as illustrated in FIG. 9, when the 3D input image signal generating unit 753 uses the 3D image information, the storing (S14) of the 2D image information 2D and the depth information DEP is omitted, and instead, the 3D image information may be directly supplied to the 3D input image signal generating unit 753.

A method of generating a 3D input image signal IDAT of each pixel PX according to an exemplary embodiment of the present invention will be described in detail with reference to FIGS. 10 to 15 together with the drawings described above.

FIGS. 10 to 15 are diagrams illustrating a method of generating a 3D image signal of one pixel by using a 2D image and depth information in the 3D image display device according to the exemplary embodiment of the present invention.

Figure 10:
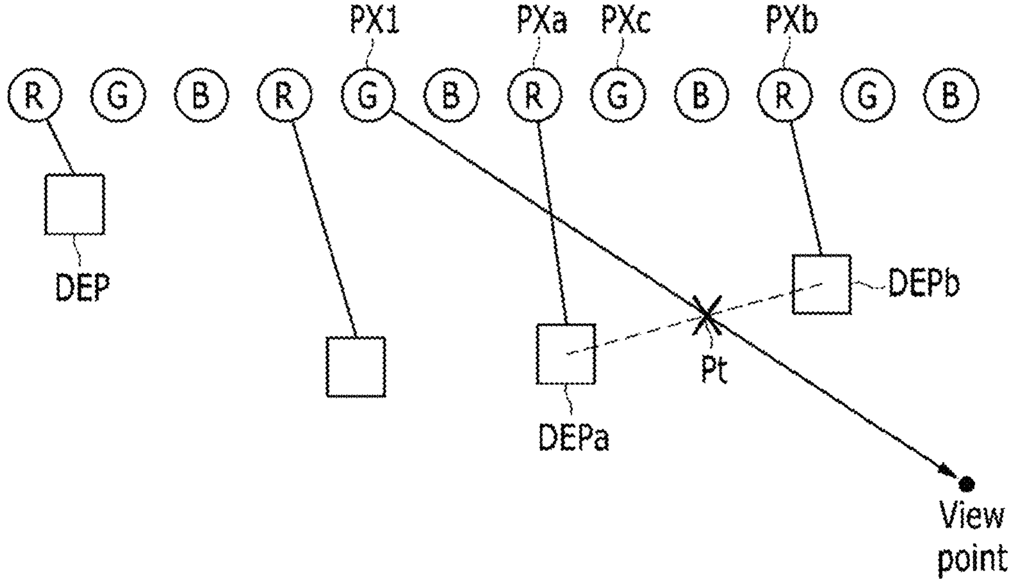
FIGS. 10 to 15 are diagrams illustrating a method of generating a 3D image signal of one pixel by using a 2D image and depth information in the 3D image display device according to an exemplary embodiment of the present invention.

First, referring to FIG. 10, the exemplary embodiment illustrates an example in which depth information DEP corresponds to one dot configured by a red pixel R, a green pixel G, and a blue pixel B, respectively. A target pixel PX1 to generate the 3D input image signal IDAT may be one of the red pixel R, the green pixel G, and the blue pixel B, and FIG. 10 illustrates an example in which the target pixel PX1 is the green pixel G.

When a view point of the target pixel PX1 is generated as illustrated in FIG. 10, a path of the light emitted from the target pixel PX1 crosses a depth surface and thus one cross point Pt exists on the depth surface.

If the depth information DEP exists on the cross point Pt, 2D image information 2D of a pixel PXc which is included in a dot to which the pixel PX corresponding to the depth information DEP belongs and displays the same color as the target pixel PX1, is determined as an image signal of the target pixel PX1. For example, as illustrated in FIG. 10, when the target pixel PX1 is the green pixel G and the pixel PX corresponding to the depth information DEP of the cross point Pt is the green pixel G, the 2D image information 2D of the pixel PX corresponding to the depth information DEP of the cross point Pt may be determined as an image signal of the target pixel PX1. Further, when the target pixel PX1 is the green pixel G and the pixel PX corresponding to the depth information DEP of the cross point Pt is the red pixel R or the blue pixel B, the 2D image information 2D of the green pixel G of the dot in which the pixel PX is included may be determined as an image signal of the target pixel PX1.

If the depth information DEP corresponding to the cross point Pt does not exist, the depth information DEP close to the cross point Pt is selected and the 2D image information 2D of a pixel PX, which represents the same color as the target pixel PX1 among the pixels PX of the dot to which a pixel PX corresponding to the selected depth information DEP belongs, may be determined as an image signal of the target pixel PX1. For example, as illustrated in FIG. 10, when the target pixel PX1 is the green pixel G and the cross point Pt is positioned between adjacent depth information DEPa and DEPb corresponding to two pixels PXa and PXb, a case where the cross point Pt is closer to left depth information DEPa of the two depth information DEPa and DEPb will be described. Since the pixel PXa corresponding to the left depth information DEPa is the red pixel R, the 2D image information 2D of the green pixel G included in the dot to which the red pixel R belongs may be determined as an image signal of the target pixel PX1. More specifically, since the pixel PXa corresponding to the left depth information DEPa is the red pixel R, the 2D image information 2D of the green pixel PXc may be determined as an image signal of the target pixel PX1.

Figure 11:
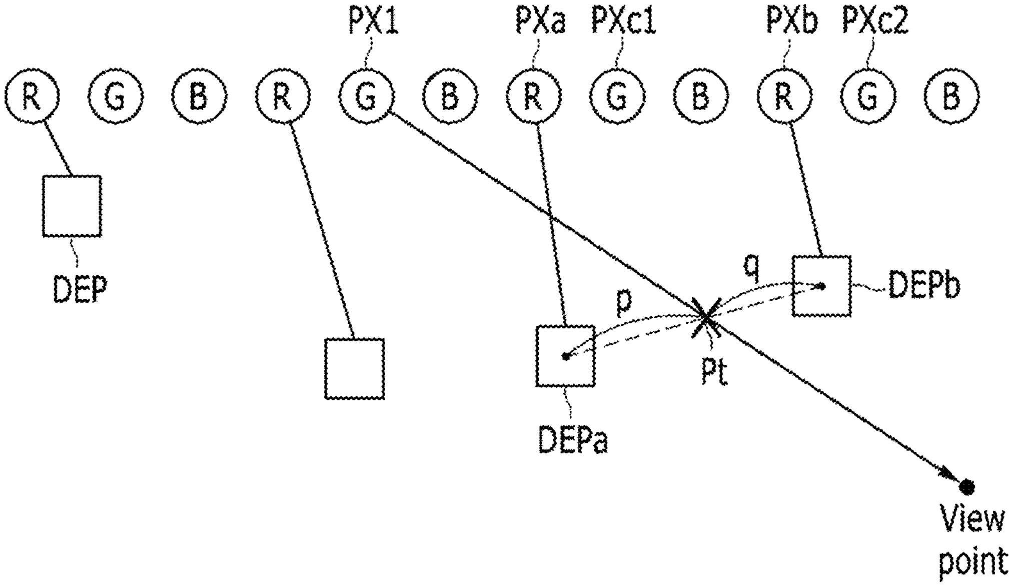

Next, referring to FIG. 11, the exemplary embodiment of the present invention is almost the same as the exemplary embodiment illustrated in FIG. 10 described above, but methods of determining an image signal of the target pixel PX1 may be different from each other.

If the depth information DEP corresponding to the cross point Pt does not exist, two depth information DEPa and DEPb adjacent to the cross point Pt are selected. Next, after distances p and q between the cross point Pt and the two depth information DEPa and DEPb are calculated, a weight is calculated from a distance ratio p:q. For example, the weight may be determined as (1/p):(1/q). Next, pixels PXc1 and PXc2, which are included in a dot to which the pixels PXa and PXb corresponding to the two depth information DEPa and DEPb belong and have the same color as the target pixel PX1, are found. In the exemplary embodiment illustrated in FIG. 11, since the target pixel PX1 is the green pixel G, the pixels PXc1 and PXc2 correspond to the green pixel G. Next, an image signal obtained by is interpolating the 2D image information 2D of the two pixels PXc1 and PXc2 by using the weight may be determined as the image signal of the target pixel PX1. For example, in the case where the weight obtained from the distance ratio p:q is 1:2, after adding a value obtained by multiplying 2D image information 2D of the left pixel PXc1 by 1 and a value obtained by multiplying 2D image information 2D of the right pixel PXc2 by 2, a value obtained by dividing the added value by 3 may be determined as the image signal of the target pixel PX1.

Figure 12:
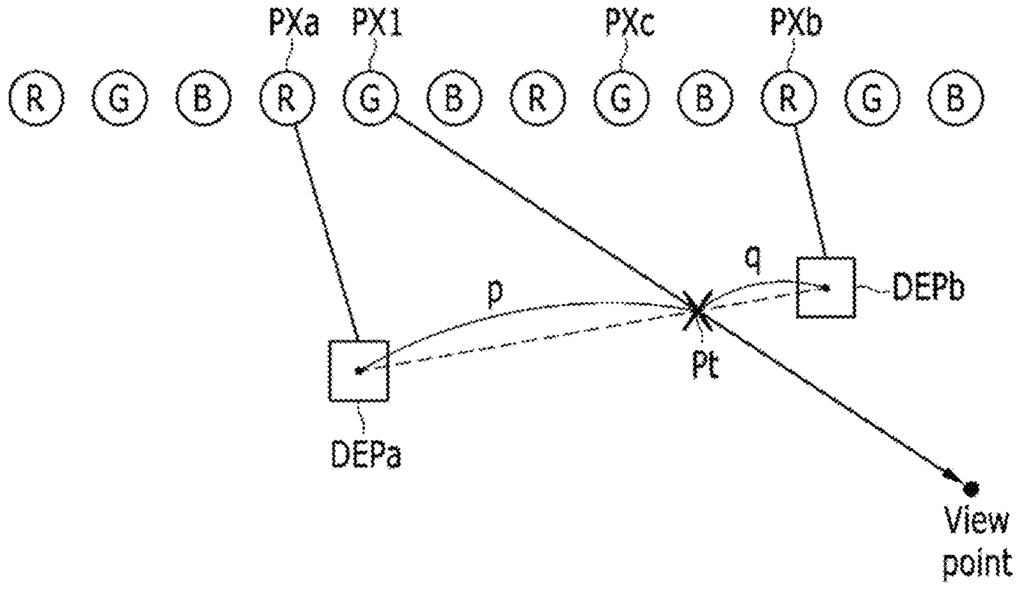

Next, referring to FIG. 12, the exemplary embodiment is almost the same as the exemplary embodiment illustrated in FIG. 10 described above, but an example in which the resolution of the depth information DEP is lower is illustrated. For example, one depth information DEP may correspond to at least two dots.

Similarly to the exemplary embodiment illustrated in FIG. 10, when the depth information DEP exists on the cross point Pt, 2D image information 2D of a pixel which is included in a dot to which the pixel PX corresponding to the depth information DEP belongs and represents the same color as the target pixel PX1 may be determined as an image signal of the target pixel PX1.

When the depth information DEP corresponding to the cross point Pt does not exist, two depth information DEPa and DEPb adjacent to the cross point Pt are selected, and the pixel PX corresponding to the cross point Pt is found by a ratio of the distances p and q between the cross point Pt and the two depth information DEPa and DEPb. In this case, a pixel PX which is closest to a coordinate on the display panel 300 obtained by the ratio of the distances p and q between the cross point Pt and the two depth information DEPa and DEPb may be found. When a color displayed by the found pixel PX is the same as a color displayed by the target pixel PX1, the 2D image information 2D of the pixel PXc may be determined as the image signal of the target pixel PX1.

Figure 13:
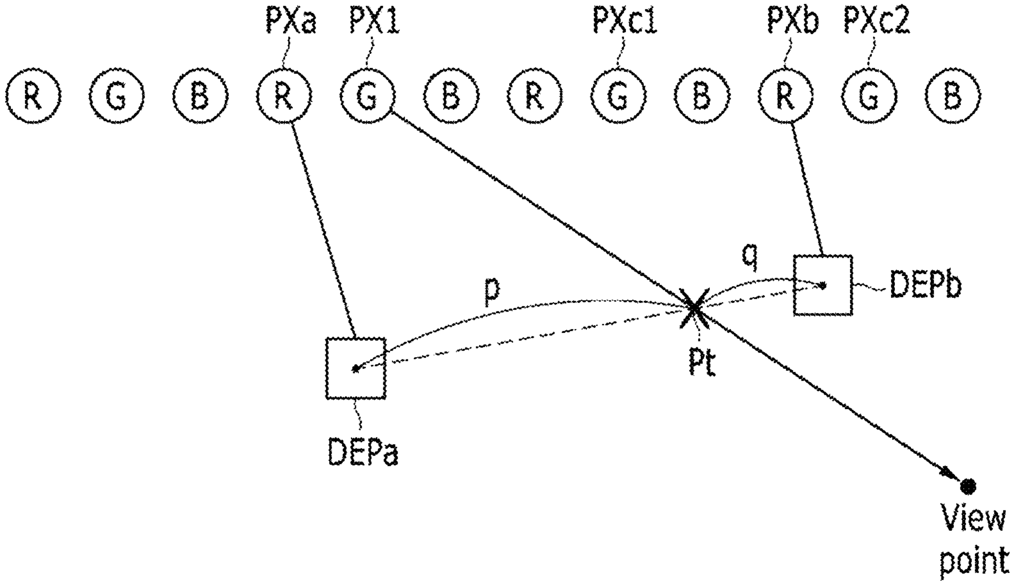

Next, referring to FIG. 13, the exemplary embodiment of the present invention is almost the same as the exemplary embodiment illustrated in FIG. 12 described above, but methods of finding the pixel PXc may be different from each other. When the depth information DEP corresponding to the cross point Pt does not exist, the two depth information DEPa and DEPb adjacent to the cross point Pt are selected as described above, and a coordinate on the display panel 300 corresponding to the cross point Pt is obtained by a ratio of the distances p and q between the cross point Pt and the two depth information DEPa and DEPb. Next, two pixels PXc1 and PXc2, which are positioned closest in the order to the coordinate corresponding to the cross point Pt among the pixels PX displaying the same color as the target pixel PX1, are found. In the exemplary embodiment illustrated in FIG. 13, since the target pixel PX1 is the green pixel G, the pixels PXc1 and PXc2 correspond to the green pixel G. Next, an image signal obtained by interpolating the 2D image information 2D of the two pixels PXc1 and PXc2 by using the weight may be determined as the image signal of the target pixel PX1. Here, as described above, the weight may be obtained from the ratio of the distances p and q between the cross point Pt and the two depth information DEPa and DEPb. For example, in the case where the weight obtained from the distance ratio p:q is 1:2, after adding a value obtained by multiplying 2D image information 2D of the left pixel PXc1 by 1 and a value obtained by multiplying 2D image information 2D of the right pixel PXc2 by 2, a value obtained by dividing the added value by 3 may be determined as the image signal of the target pixel PX1.

Figure 14:
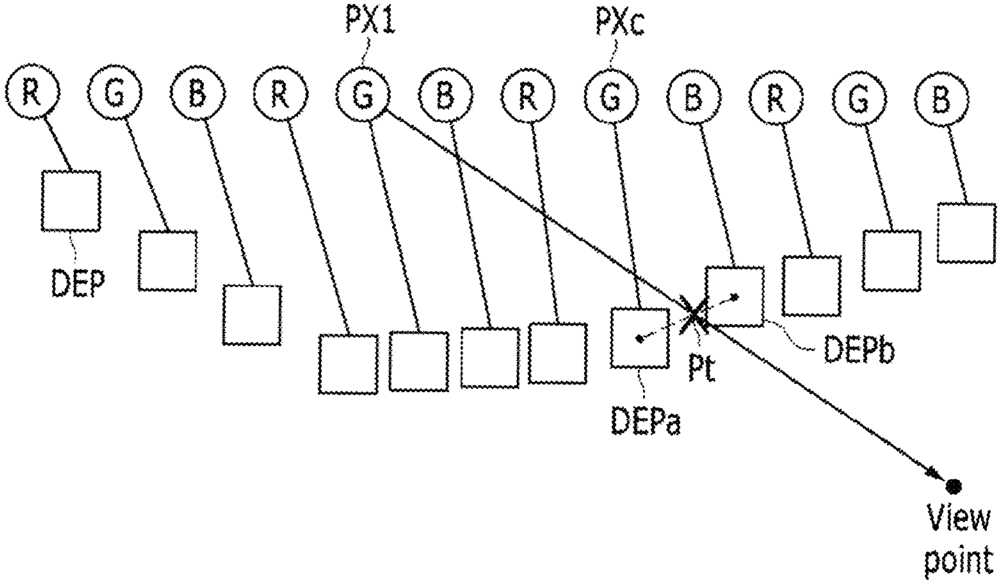

Next, referring to FIG. 14, the exemplary embodiment is almost the same as the exemplary embodiments illustrated in FIGS. 10 to 13 described above, but an example in which the resolution of the depth information DEP is higher is illustrated. For example, the depth information DEP may correspond to all the pixels PX.

Even in the exemplary embodiment, first, a cross point Pt where a path of light emitted from the target pixel PX1 and a depth surface cross each other is obtained. The cross point may be positioned between the two depth information DEPa and DEPb, and may correspond to any one depth information DEP.

In this case, the pixel PXc which is closest to the cross point Pt among the pixels PX displaying the same color as the target pixel PX1 is selected, and the 2D image information 2D of the pixel PXc may be determined as the image signal of the target pixel PX1.

Figure 15:
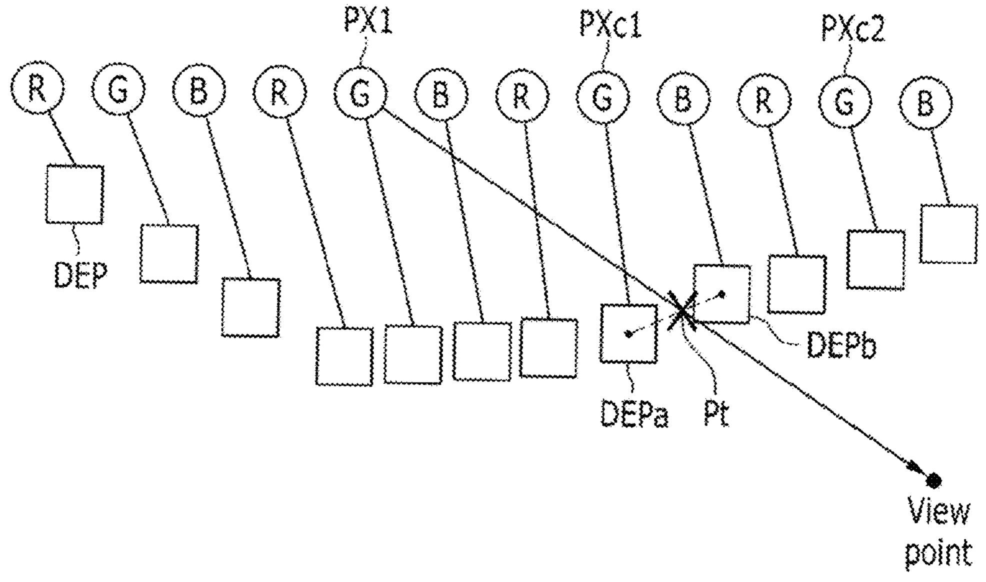

Next, referring to FIG. 15, the exemplary embodiment is almost the same as the exemplary embodiment illustrated in FIG. 14 described above, but methods of determining an image signal of the target pixel PX1 may be different from each other. That is, two pixels PXc1 and PXc2, which are positioned closest in the order to the cross point Pt among the pixels PX displaying the same color as the target pixel PX1, are selected. Next, an image signal obtained by interpolating the 2D image information 2D of the two pixels PXc1 and PXc2 by using the weight may be determined as the image signal of the target pixel PX1. Here, the weight may be determined by using a distance ratio between a corresponding coordinate on the display panel 300 of the cross point Pt and the two pixels PXc1 and PXc2. The distance ratio between the corresponding coordinate on the display panel 300 of the cross point Pt and the two pixels PXc1 and PXc2 corresponds to a distance ratio between the depth information corresponding to the two pixels PXc1 and PXc2 and the cross point Pt.

According to another exemplary embodiment of the present invention, the 3D input image signal generating unit 753 may determine an image signal of each pixel PX by using the 3D image information. In this case, since the 3D image information also includes the depth information corresponding to the depth information DEP described above, like the exemplary embodiments illustrated in FIGS. 10 to 15 described above, the cross point Pt between the path of the light emitted from each pixel PX and the depth information is obtained and then finally, the image signal of the target pixel PX1 may be determined by using the 3D image information of the found pixel PX.

As such, according to an exemplary embodiment of the present invention, the image signal of each pixel PX may be generated by using a simple equation, and as a result, the 3D input image signal IDAT may be obtained. Accordingly, the 3D image may be displayed without requiring a process of complicated image signal processing. Furthermore, since the image signal is just obtained based on the pixel PX, not the view point, even though the view points are continuously expanded, the image need not to be generated for each view point, and as a result, the image signal processing process may be simplified.

Further, according to an exemplary embodiment of the present invention, since the image is displayed by generating the image signal suitable for an emission direction of the light of each pixel PX, the number of view points may be easily increased, and as a result, a double image is not viewed in all the viewing directions and a clear 3D image may be viewed.

A method of displaying a 3D image of the 3D image display device according to an exemplary embodiment of the present invention will be described with reference to FIGS. 16 to 24 together with the drawings described above.

Figure 16:
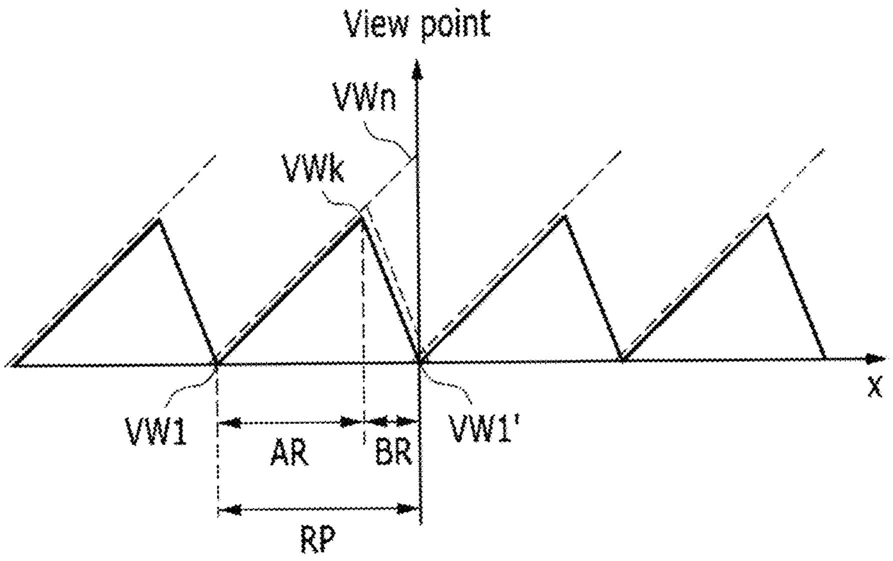
FIGS. 16 and 17 are graphs illustrating views periodically arranged in the 3D image display device according to an exemplary embodiment of the present invention.
Figure 17:
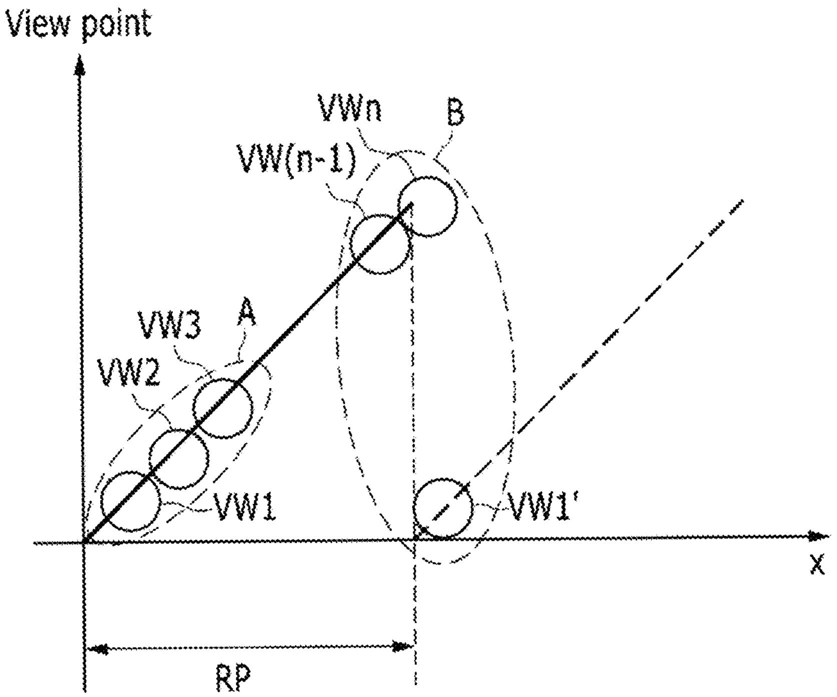
Figure 18:
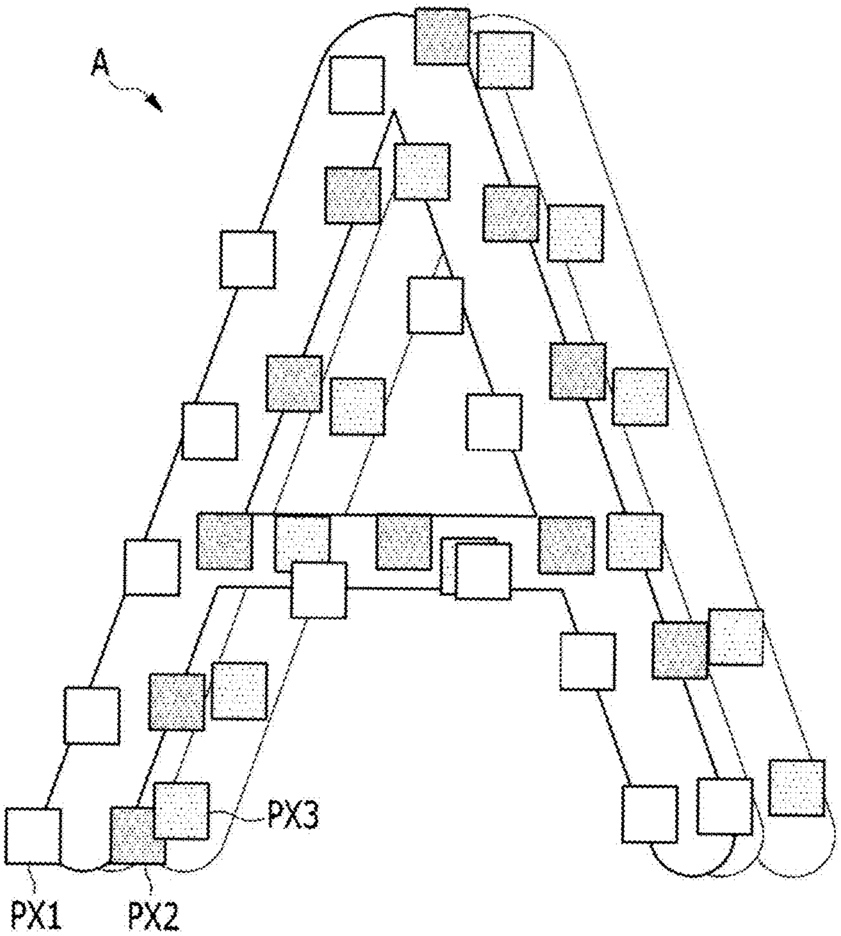
FIG. 18 is a diagram illustrating images displayed by pixels corresponding to views of a portion A illustrated in FIG. 17.
Figure 19:
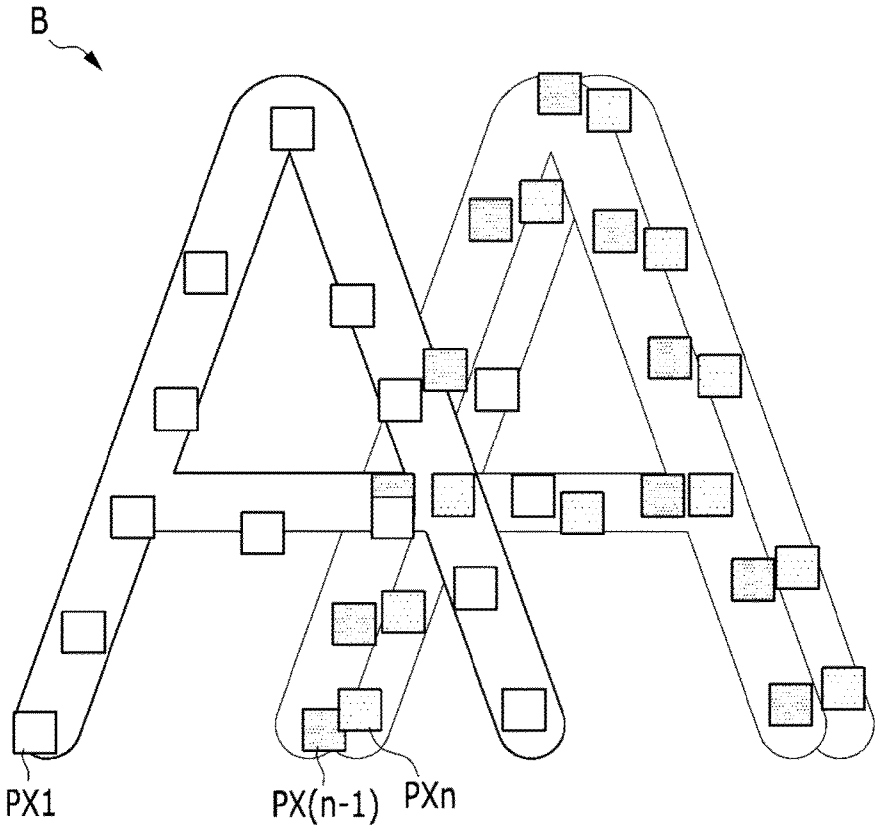
FIG. 19 is a diagram illustrating images displayed by pixels corresponding to views of a portion B illustrated in FIG. 17.

FIGS. 16 and 17 are graphs illustrating views periodically arranged in the 3D image display device according to an exemplary embodiment of the present invention, FIG. 18 is a diagram illustrating images displayed by pixels corresponding to views of a portion A illustrated in FIG. 17, FIG. 19 is a diagram illustrating images displayed by pixels corresponding to views of a portion B illustrated in FIG. 17, and FIGS. 20 to 23 are graphs illustrating views periodically arranged in the 3D image display device according to an exemplary embodiment of the present invention.

Referring to FIG. 16, an x axis represents a position of a horizontal direction of the optimal viewing distance OVD, and a y axis represents a view point of each unit view area RP.

Since view points VW1-VWn are sequentially disposed in one unit view area RP and the layout of the view points VW1-VWn is countered for each unit view area RP, the view points VW1-VWn may be represented like a dotted line of FIG. 16 or a graph of FIG. 17. In this case, the first view point VW1 to the n-th view point VWn are positioned in one unit view area RP, and a k-th view point VWk (k is a natural number smaller than n) may be positioned therebetween.

When the view points VW1-VWn are increased, the view points VW1-VWn are allocated to a finite number of pixels PX, and as a result, the number of pixels PX viewed in one view point may be decreased. However, since the images formed in the adjacent view points VW1-VWn of one unit view area RP are seen to be mixed, the resolution is not substantially seen to be low.

In detail, referring to FIGS. 17 and 18, when the sequentially adjacent view points VW1, VW2, and VW3, which are positioned in a region A in one unit view area RP, correspond to the respective pixels PX1, PX2, and PX3, images viewed in the view points VW1, VW2, and VW3 are continuously formed as illustrated in FIG. 18, and as a result, a difference between the respective images, that is, a shift between the images is small. Accordingly, since the adjacent images are seen to be mixed, the resolution is not substantially seen to be low.

However, referring to FIGS. 17 and 19, when sequential view points VW(n−1), VWn, and VW1', which are positioned in a region B over the adjacent unit view area RP correspond to the respective pixels PX(n−1), PXn, and PX1, images viewed in the view points VW(n−1), VWn, and VW1' include two images having a large difference between the images, that is, a large shift between the images, as illustrated in FIG. 19. Accordingly, the resolution is seen to be very low in the view points VW(n−1), VWn, and VW1', and as a result, quality of the 3D image may deteriorate.

In order to solve the problem in that the resolution seriously deteriorates, a predetermined difference or a predetermined shift may exist even between the adjacent images corresponding to the view points VW1-VWn over the adjacent unit view area RP like the view points VW1-VWn positioned in one unit view area RP. In detail, like the graph illustrated in FIG. 16, when the view points VW1-VWn are represented by the y axis, view points smaller than a reference view point VWk may be mapped upwards, or view points larger than the reference view point VWk may be mapped downwards. In this case, the mapped view points may not exceed approximately a half (½) of all the view points VW1-VWn.

FIG. 16 illustrates an example in which the view points larger than the reference view point VWk are mapped downwards. According to this, images viewed in the view point VWn and the view point VW1', which are positioned in the adjacent unit view areas RP, respectively, have the same difference or shift as the images viewed in the adjacent view points VW1-VWn positioned in one unit view area RP, the resolution of images sequentially viewed does not deteriorate. According to this, one unit view area RP may include an orthoscopic region AR where an orthoscopic image is viewed and a reverse-scopic region BR where a reverse-scopic image is viewed. Since the reverse-scopic region BR may be smaller than the orthoscopic region AR, the number of mapped view points may not exceed approximately a half of all the view points VW1-VWn as described above, and as a result, the range of the reverse-scopic region BR is smaller than that of the orthoscopic region AR.

As such, according to an exemplary embodiment of the present invention, it is possible to reduce a reverse phenomenon in which left and right images are reversely inputted to a left eye and a right eye, increase a 3D image viewing area, and prevent the resolution of the 3D image from deteriorating.

Figure 20:
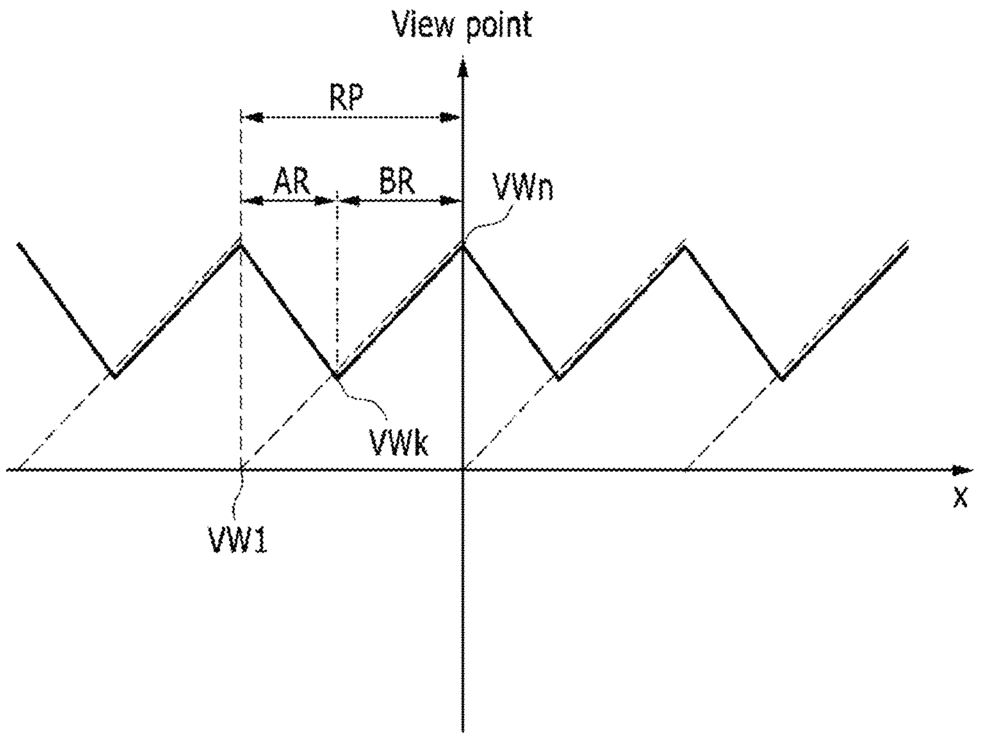
FIGS. 20 to 23 are graphs illustrating views periodically arranged in the 3D image display device according to an exemplary embodiment of the present invention.

FIG. 20 is almost the same as the exemplary embodiment illustrated in FIG. 16, but an example in which the view points smaller than the reference view point VWk are mapped upwards is illustrated. As a result, a position of the orthoscopic region AR and the reverse-scopic region BR may be reversed. Even in the exemplary embodiment, the range of the reverse-scopic region BR may be smaller than that of the orthoscopic region AR.

Figure 21:
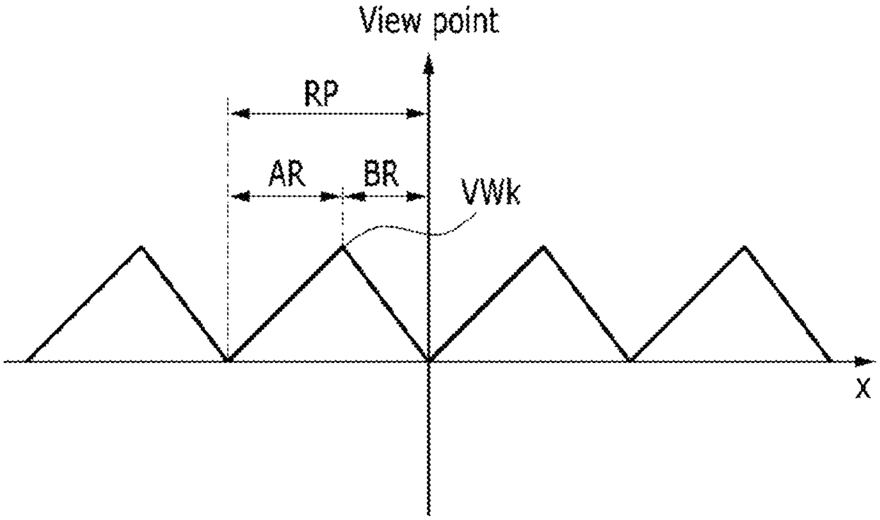

Referring to FIG. 21, the exemplary embodiment is almost the same as the exemplary embodiment illustrated in FIG. 16 or 20, but a position of the reference view point VWk may vary. Accordingly, slopes of a view point graph mapped in the reverse-scopic region BR may be variously changed.

Figure 22:
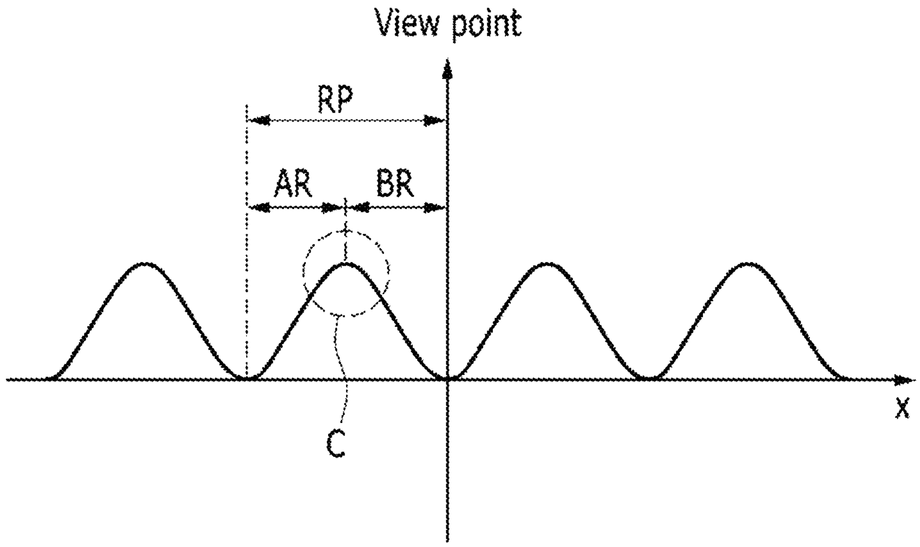

Referring to FIG. 22, the exemplary embodiment is almost the same as the exemplary embodiments described above, but a region in which the view point graph is curved may be made of a curved line like a region C. That is, the slopes of the graph may be continuously changed on the boundary of the orthoscopic region AR and the reverse-scopic region BR. Accordingly, the deterioration of the resolution of an image which is viewed near an uppermost view point or lowermost view point or on the boundary of the orthoscopic region AR and the reverse-scopic region BR may be further reduced.

Figure 23:
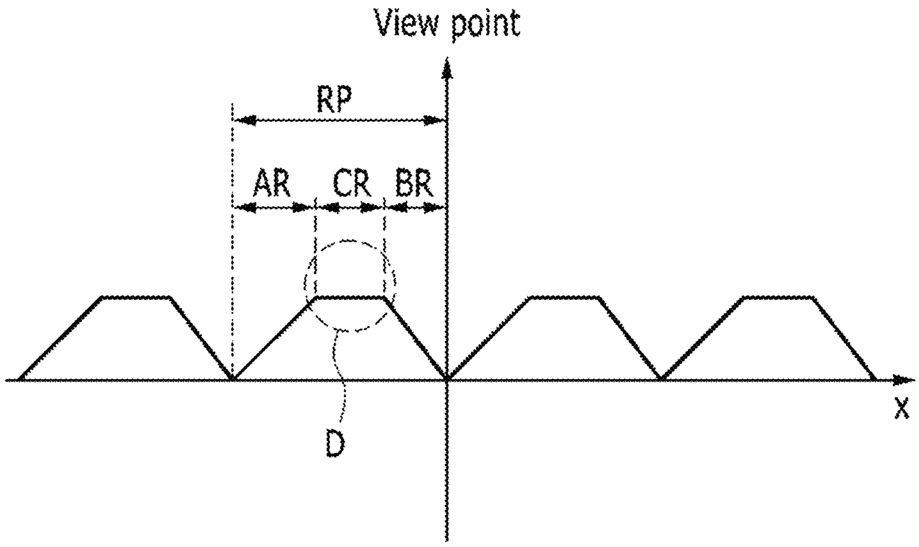

Referring to FIG. 23, the exemplary embodiment is almost the same as the exemplary embodiments described above, but a planarization region CR may be further included on the boundary of the orthoscopic region AR and the reverse-scopic region BR like a region D. A slope of a graph in the planarization region CR may have a value between a slope of the graph in the orthoscopic region AR and a slope of the graph in the reverse-scopic region BR. For example, the slope of the graph in the planarization region CR may be approximately 0. Accordingly, the deterioration of the resolution of an image which is viewed near an uppermost view point or lowermost view point or on the boundary of the orthoscopic region AR and the reverse-scopic region BR may be further reduced.

A 3D image display device and a method of displaying a 3D image according to an exemplary embodiment of the present invention will be described in detail with reference to FIG. 24 together with the drawings described above.

Figure 24:
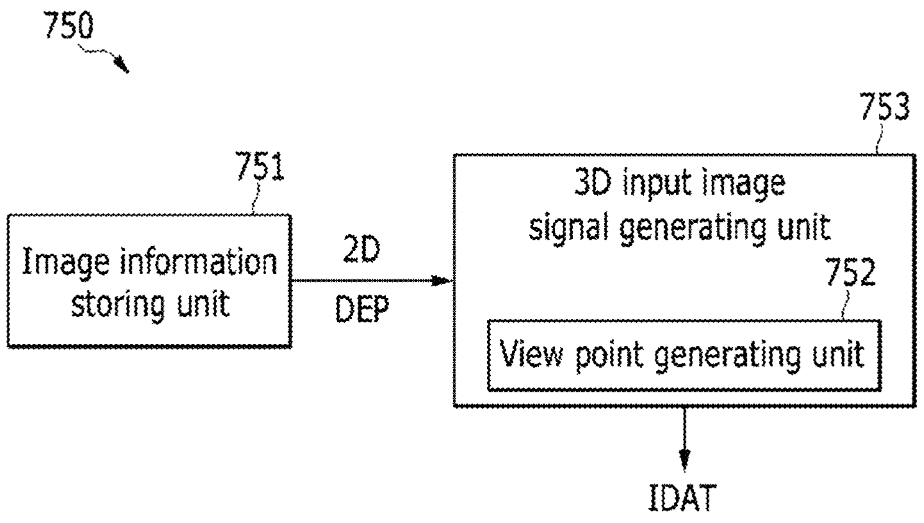
FIG. 24 is a block diagram illustrating an image processor of the 3D image display device according to an exemplary embodiment of the present invention.
Figure 25:
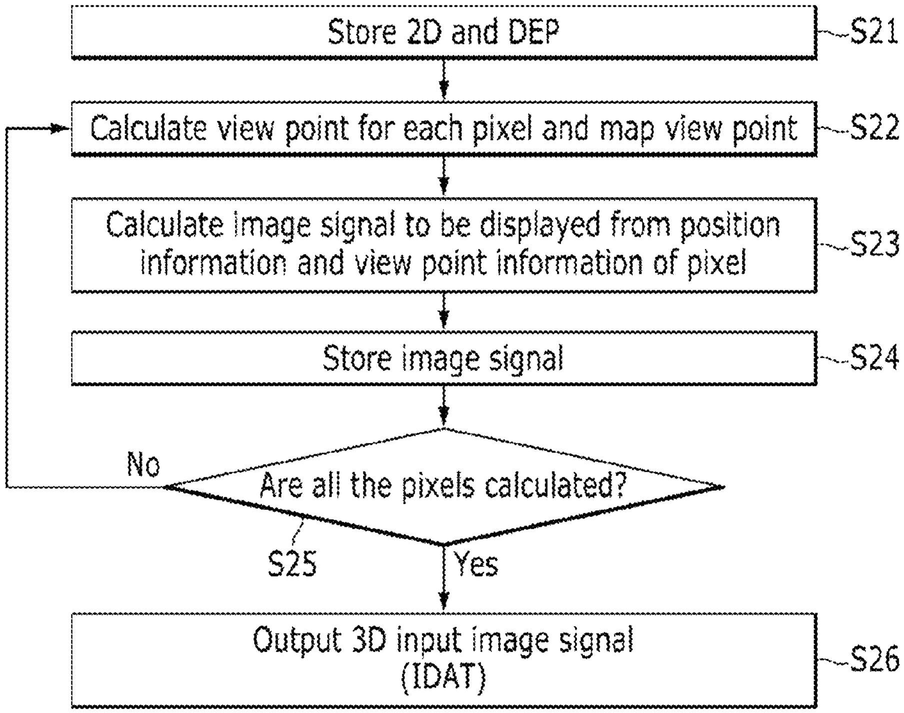
FIG. 25 is a flowchart illustrating a process of generating a 3D image signal in the 3D image display device according to an exemplary embodiment of the present invention.

FIG. 24 is a block diagram illustrating an image processing unit of a 3D image display device according to an exemplary embodiment of the present invention, and FIG. 25 is a flowchart illustrating a process of generating a 3D image signal in the 3D image display device according to the exemplary embodiment of the present invention.

First, referring to FIG. 24, the image signal processor 750 according to an exemplary embodiment of the present invention is almost the same as the exemplary embodiment illustrated in FIG. 4 described above, but the 3D input image signal generating unit 753 may include the view point generating unit 752. Accordingly, unlike the exemplary embodiment illustrated in FIG. 4, the view points corresponding to the respective pixels PX are not pre-generated and stored, but the view points corresponding to the respective pixels PX may be generated in real time before image signals to be displayed by the respective pixels PX are generated. The 3D input image signal generating unit 753 generates the 3D input image signal IDAT based on information on a position of the pixel PX, information on a view point of each pixel PX, and image information with respect to each pixel PX.

The image information used in the 3D input image signal generating unit 753 may be 3D image information as the image information DATA inputted from the outside, and may be 2D image information 2D and depth information DEP. FIG. 24 illustrates an example in which the 3D input image signal generating unit 753 uses the 2D image information and the depth information DEP. Accordingly, according to another exemplary embodiment of the present invention, the image signal processor 750 may further include the image information storing unit 751 storing the 2D image information 2D and the depth information DEP.

Referring to FIG. 25, when the 3D input image signal generating unit 753 generates the 3D input image signal IDAT by using the 2D image information 2D and the depth information DEP, the image information storing unit 751 stores the inputted or generated 2D image information 2D and depth information DEP (S21).

Next, the 3D input image signal generating unit 753 generates a view point corresponding to each pixel PX of the display panel 300 and maps the generated view point in each pixel PX (S22). Next, the 3D input image signal generating unit 753 generates an image signal to be displayed by the corresponding pixel PX based on information on a position of the pixel PX, information on a view point of the pixel PX, and the 2D image information 2D and the depth information DEP or 3D image information, which are the image information (S23). The generated image signal of each pixel PX may be stored in a separate memory (S24). After the process is repeated until the generating of the image signals for all the pixels PX ends (S25), the 3D input image signals IDAT, which are the image signals for all the pixels PX, are outputted (S26).

Unlike as illustrated in FIG. 25, when the 3D input image signal generating unit 753 uses the 3D image information, the storing (S21) of the 2D image information 2D and the depth information DEP is omitted, and instead, the 3D image information may be directly supplied to the 3D input image signal generating unit 753.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A 3D image display device, comprising:

a display panel comprising pixels;

a signal controller configured to drive the display panel; and an image signal processor configured to generate a 3D input image signal based on image information and output the generated 3D input image signal to the signal controller, the image information being associated with depth information, wherein the image signal processor comprises:

a view point generating unit configured to generate view points corresponding to the pixels; and a 3D input image signal generating unit configured to generate the 3D input image signal for the pixels based on information on positions of the pixels, information on the generated view points for the pixels, and the image information, wherein, for a target pixel, the image signal processor is configured to:

determine a cross point of a depth surface in the depth information and a path of light emitting from the target pixel where a view point of the view points is generated; and determine a 3D input image signal for the target pixel using the cross point and image information of at least one pixel adjacent to the cross point, the at least one adjacent pixel and the target pixel being configured to output a same color.

2. The 3D image display device of claim 1, wherein:

the display panel is configured to display an image via unit view areas, each unit view area having a viewing angle;

each unit view area comprises the generated view points corresponding to the pixels; and each unit view area comprises:

an orthoscopic region where the generated view points are sequentially disposed and an orthoscopic image is displayed; and a reverse-scopic region where the generated view points are reversely disposed and a reverse-scopic image is displayed.

3. The 3D image display device of claim 1, wherein a resolution of the depth information is less than or equal to a resolution of the pixels of the display panel.

4. The 3D image display device of claim 1, wherein:

the pixels are grouped into dots, each dot of the dots comprises a set of pixels configured to display different colors from each other;

the depth information corresponds, one-by-one, to each dot of the dots; and the image signal processor is configured to:

select a depth information, among a first depth information and a second depth information both adjacent to the cross point, that is closer to the cross point; and use, as the 3D input image signal of the target pixel, the image information of the at least one adjacent pixel that is configured to display the same color as the target pixel among pixels of a dot of the dots that corresponds to the selected depth information.

5. The 3D image display device of claim 1, wherein:

the at least one adjacent pixel comprises a first pixel and a second pixel;

the pixels are grouped into dots, each dot of the dots comprises a set of pixels configured to display different colors from each other;

the depth information corresponds, one-by-one, to each dot of the dots; and the image signal processor is configured to:

select a first depth information and a second depth information both adjacent to the cross point;

obtain a weight from a ratio of a distance between the cross point and the first depth information to a distance between the cross point and the second depth information; and use, as the 3D input image signal of the target pixel, image information obtained via application of the weight to image information of the first pixel configured to display the same color as the target pixel among pixels of a dot of the dots that corresponds to the first depth information and image information of the second pixel configured to display the same color as the target pixel among pixels of a dot of the dots that corresponds to the second depth information.

6. The 3D image display device of claim 1, wherein:

the at least one adjacent pixel comprises a third pixel and pixels adjacent to the third pixel;

the pixels are grouped into dots, each dot of the dots comprises a set of pixels configured to display different colors from each other;

a resolution of the depth information is smaller than a resolution of the dots; and the image signal processor is configured to:

select a first depth information and a second depth information both adjacent to the cross point;

obtain a ratio of a distance between the cross point and the first depth information to a distance between the cross point and the second depth information;

determine the third pixel, which is closest to a point on the display panel corresponding to the cross point using the ratio; and use, as the 3D input image signal of the target pixel, image information of a pixel configured to display the same color as the target pixel among the third pixel and the pixels adjacent to the third pixel.

7. The 3D image display device of claim 1, wherein:

the at least one adjacent pixel comprises a first pixel and a second pixel;

the pixels are grouped into dots, each dot of the dots comprises a set of pixels configured to display different colors from each other;

a resolution of the depth information is smaller than a resolution of the dots; and the image signal processor is configured to:

select a first depth information and a second depth information both adjacent to the cross point;

obtain a ratio of a distance between the cross point and the first depth information to a distance between the cross point and the second depth information;

determine the first pixel and the second pixel that are positioned closest in an order to a point on the display panel corresponding to the cross point using the ratio; and use, as the 3D input image signal of the target pixel, image information obtained via application of a weight obtained from the ratio to image information of the first pixel and image information of the second pixel.

8. The 3D image display device of claim 1, wherein:

the pixels are grouped into dots, each dot of the dots comprises a set of pixels configured to display different colors from each other;

a resolution of the depth information is the same as a resolution of the pixels; and the image signal processor is configured to:

use, as the 3D input image signal of the target pixel, image information of the at least one adjacent pixel that is closest to the cross point among pixels configured to display the same color as the target pixel.

9. The 3D image display device of claim 1, wherein:

the at least one adjacent pixel comprises a first pixel and a second pixel;

the pixels are grouped into dots, each dot of the dots comprises a set of pixels configured to display different colors from each other;

a resolution of the depth information is the same as a resolution of the pixels; and the image signal processor is configured to:

determine the first pixel and the second pixel that are positioned closest in an order to the cross point among pixels configured to display the same color as the target pixel; and use, as the 3D input image signal of the target pixel, image information obtained via application to image information of the first pixel and image information of the second pixel a weight obtained from a ratio of a distance between a point on the display panel corresponding to the cross point and the first pixel to a distance between the point on the display panel corresponding to the cross point and the second pixel.

10. The 3D image display device of claim 2, wherein a range of the reverse-scopic region is smaller than a range of the orthoscopic region in each unit view area.

11. The 3D image display device of claim 10, wherein:

the view point generating unit is positioned in the 3D input image signal generating unit; and the view point generating unit is configured to generate a view point for a pixel of the pixels in real time before generation of the 3D input image signal for the pixel.

12. A method of displaying a 3D image in a 3D image display device comprising a display panel comprising pixels and an image signal processor configured to generate a 3D input image signal based on image information associated with depth information, the method comprising:

generating view points corresponding to the pixels; and generating the 3D input image signal for the pixels based on information on positions of the pixels, information on the generated view points for the pixels, and the image information, wherein, for a target pixel, generating a 3D input image signal comprises:

determining a cross point of a depth surface in the depth image information and a path of light emitted from the target pixel where a view point of the view points is generated: and generating the 3D input image signal for the target pixel using the cross point and image information of at least one pixel adjacent to the cross point, the at least one adjacent pixel and the target pixel being configured to output a same color.

13. The method of displaying a 3D image of claim 12, wherein:

an image is displayed via unit view areas, each unit view area having a viewing angle;

each unit view area comprises the generated view points corresponding to the pixels; and each unit view area comprises:

an orthoscopic region where the generated view points are sequentially disposed and an orthoscopic image is displayed; and a reverse-scopic region where the generated view points are reversely disposed and a reverse-scopic image is displayed.

14. The method of displaying a 3D image of claim 12, wherein:

the pixels are grouped into dots, each dot of the dots comprises a set of pixels configured to display different colors from each other;

the depth information corresponds, one-by-one, to each dot of the dots; and generating the 3D input image signal comprises:

selecting a depth information, among a first depth information and a second depth information both adjacent to the cross point, that is closer to the cross point, and using, as the 3D input image signal of the target pixel, the image information of the at least one adjacent pixel configured to display the same color as the target pixel among pixels of a dot of the dots that corresponds to the selected depth information; or after selecting a first depth information and a second depth information both adjacent to the cross point and obtaining a weight from a ratio of a distance between the cross point and the first depth information to a distance between the cross point and the second depth information, using, as the 3D input image signal of the target pixel, image information obtained by applying the weight to image information of a first pixel configured to display the same color as the target pixel among pixels of a dot of the dots that corresponds to the first depth information and image information of a second pixel configured to display the same color as the target pixel among pixels of a dot of the dots that corresponds to the second depth information, the at least one adjacent pixel comprising the first pixel and the second pixel.

15. The method of displaying a 3D image of claim 12, wherein:

the pixels are grouped into dots, each dot of the dots comprises a set of pixels configured to display different colors from each other;

a resolution of the depth information is smaller than a resolution of the dots; and generating the 3D input image signal comprises:

after selecting a first depth information and a second depth information both adjacent to the cross point, obtaining a ratio of a distance between the cross point and the first depth information to a distance between the cross point and the second depth information, and determining a third pixel closest to a point on the display panel corresponding to the cross point using the ratio, using, as the 3D input image signal of the target pixel, image information of a pixel configured to display the same color as the target pixel among the third pixel and pixels adjacent to the third pixel, the at least one adjacent pixel comprising the third pixel and the pixels adjacent to the third pixel; or after selecting a first depth information and a second depth information both adjacent to the cross point, obtaining a ratio of a distance between the cross point and the first depth information to a distance between the cross point and the second depth information, and determining a first pixel and a second pixel that are positioned closest in an order to a point on the display panel corresponding to the cross point using the ratio, the at least one adjacent pixel comprising the first pixel and the second pixel that are configured to display the same color as the target pixel, using, as the 3D input image signal of the target pixel, image information obtained by applying a weight obtained from the ratio to image information of the first pixel and image information of the second pixel.

16. The method of displaying a 3D image of claim 12, wherein:

the pixels are grouped into dots, each dot of the dots comprises a set of pixels configured to display different colors from each other;

a resolution of the depth information is the same as a resolution of the pixels; and generating the 3D input image signal comprises:

using, as the 3D input image signal of the target pixel, image information of the at least one adjacent pixel that is closest to the cross point among pixels configured to display the same color as the target pixel; or after determining a first pixel and a second pixel that are positioned closest in an order to the cross point among pixels configured to display the same color as the target pixel, using, as the 3D input image signal of the target pixel, image information obtained by applying to image information of the first pixel and image information of the second pixel a weight obtained from a ratio of a distance between a point on the display panel corresponding to the cross point and the first pixel to a distance between the point on the display panel corresponding to the cross point and the second pixel, the at least one adjacent pixel comprising the first pixel and the second pixel.

17. The method of displaying a 3D image of claim 13, wherein a range of the reverse-scopic region is smaller than a range of the orthoscopic region in each unit view area.

18. The method of displaying a 3D image of claim 12, wherein a view point for a pixel of the pixels is generated in real time before generation of the 3D input image signal for the pixel.

* * * * *